J. CAILLET.
DRIVING GEAR FOR AUTOMOBILE VEHICLES.
APPLICATION FILED SEPT. 10, 1907.
1,070,772.
Patented Aug. 19, 1913.
2 SHEETS—SHEET 1.
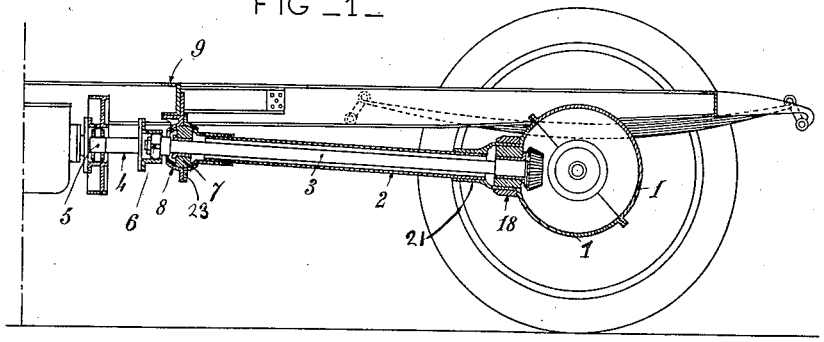
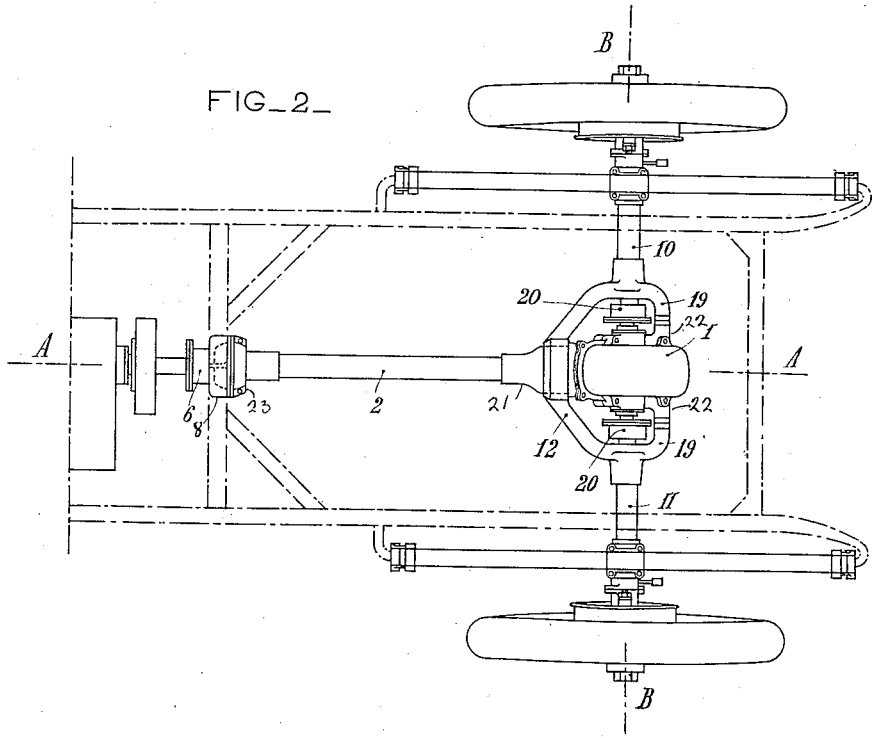

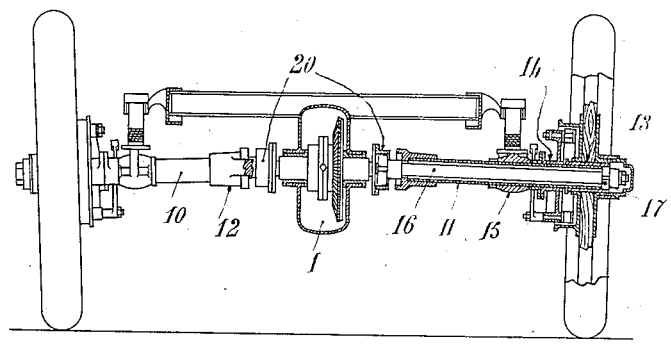
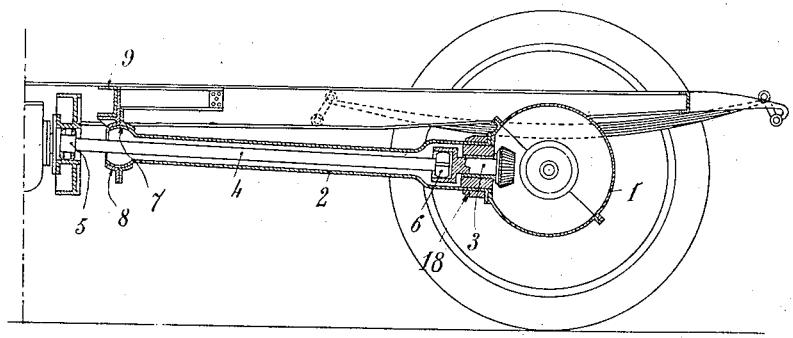

UNITED STATES PATENT OFFICE.

JULES CAILLET, OF PARIS, FRANCE, ASSIGNOR TO SOCIETE ANONYME DES AUTOMOBILES PEUGEOT, OF PARIS, FRANCE.

DRIVING-GEAR FOR AUTOMOBILE VEHICLES.

1,070,772.                   Specification of Letters Patent.      Patented Aug. 19, 1913.

Application filed September 10, 1907. Serial No. 392,124.

*To all whom it may concern:*

Be it known that I, JULES CAILLET, citizen of France, residing at 66 Avenue de la Grande Armée, Paris, in the Republic of France, have invented certain new and useful Improvements in Driving-Gears for Automobile Vehicles, of which the following is a specification.

The object of the present invention is a driving gear particularly adapted for automobile freight wagons and like vehicles and constituting essentially an oscillatable coupling axle comprising in combination a hollow axle carrying the frame and a system of differential gear, which parts together and without any other members effect the following conditions necessary to good running. Firstly: to counterbalance the reversing couple of forces which takes place by controlling the differential gear by means of a bevel pinion; secondly, to serve as a coupling for keeping the rear hub in place and transmitting the driving effort from the wheels to the vehicle; thirdly, to allow of giving to the driving wheels the desired inclined or outward splay; and fourthly, to permit of easily dismounting the differential gear, the vehicle always remaining supported by the hub.

Embodiments of the invention are shown in the accompanying drawing in which—

Figure 1 is a vertical section on the line A A of Fig. 2, the latter being a plan view of part of the automobile with the improved gear applied. Fig. 3 is a section on the line B B of Fig. 2, and Fig. 4 is a vertical section of a modification.

The differential gear comprising the two controlling angle pinions and the planetary gears or pinions is inclosed in the usual manner within the casing 1. Secured to an elongated extension 21 of said casing is a long tube 2 through which passes the shaft 3 carrying the bevel pinion and driven by the shaft 4. The latter receives movement from the change speed gear or more usually from the motor by means of a coupling 5, and transmits said movement to the shaft 3 by means of a universal joint 6. The end of the tube 2 at the end opposite the differential gear is formed as a spherical cup 7 adapted to engage or be inclosed by a support 8 carried by a cross-bar 9 of the vehicle frame. The cup 7 is connected to the support 8 by means of a shell part 23 screwed or bolted on said support.

The hollow hub comprises two straight tubular parts 10 and 11 connected together at the center by means of a curved or branched member 12 passing around the differential gear casing and serving to support the same. The parts 10 and 11 are ground or smoothed exteriorly at their outer ends and support the wheel bearings 13, the brake disk or drum 14, and the spring supports or clips 15.

The driving shaft 16 traverses the hollow parts 10 and 11 and drives the wheels which are connected thereto at 17, each of its parts being provided with a universal joint 20.

The brake disk is secured by means of pins to a part brazed to the tube so that it may be easily dismounted and the spring supports or clips can rotate on said tube so as to allow the springs free play.

The member 12 is provided in front and at its center with an eye or socket 18 through which is passed and fitted the tube 2, together with the elongated extension 21 of the gear casing 1, and at the back said member 12 is provided with two extensions 19 to which is fixed the gear casing which is thus rigidly connected to the member 12. Said rigid connection is insured by means of lugs 22 formed on the gear casing and adapted to be bolted to the extensions 19 of the member 12.

The coupling or connection of the driving shaft is effected as previously mentioned by means of the universal joints between the shafts of the differential gear and the two parts of the shaft 16 within the tubes 10 and 11, and said shaft parts as well as the tubes can have the necessary inclination to give the wheels the advantageous outward splay as shown more particularly in Fig. 3.

The eye 18 above referred to is of a slightly larger size than that of the cup 7 of the tube 2, so that the differential gear together with the tube 2 and the driving shaft 3 may be removed as a whole from the back of the vehicle, when the connections of the cup with its support 8, of the gear casing 1 with the extensions 19, and of the shafts 16 with the differential gear are released. By this arrangement, the vehicle can continue to be supported by its hollow hub 10, 11, 12 although the whole of the differential gear and casing is removed.

During running the reversing couple is counterbalanced by the tube 2 bearing against the cup 8, and in the same manner the entire propelling effort of the oscillating hub and driving wheels is transmitted to the vehicle through the cup 8 and its support. This construction of cup and support permits all possible displacements of the driving gear relatively to the frame and at the same time the springs operate as usual owing to the method of mounting their supports or clips.

Fig. 4 shows a modification. While in Fig. 1 the shaft 3 is inclosed in the tube 2 for its entire length the two joints 5 and 6 being outside the tube, on the contrary, in Fig. 4 the shaft 3 is very short and the shaft 4 extends into the tube, one of the universal joints 6 being placed as near as possible to the differential gear. Similar reference numerals are used in this figure to indicate similar parts shown in the previous figures.

Figs. 1 and 4 indicate the extreme positions capable of being occupied by the joint 6, but it is obvious that any intermediate positions are possible.

Having now described my invention, what I claim as new and desire to secure by Letters Patent is:

1. A device of the character specified, embodying therein a frame comprising a pair of forwardly projecting converging arms and a pair of rearwardly projecting converging arms, a socket carried by and connecting said forwardly projecting arms at their converging ends, a casing adapted to contain the differential gear, supported within said arms and having an elongated extension projecting through said socket, means for removably attaching said casing to the rearwardly projecting arms at their converging ends, and means supported at one end by said elongated projection for containing the motor shaft.

2. A device of the character specified, embodying therein an integral frame comprising a pair of forwardly projecting converging arms, a socket formed integrally with and connecting said forwardly projecting arms at their converging ends, a casing adapted to contain the differential gear, said casing being supported within said arms and having an elongated extension projecting through said socket, a tube supported at one end by said extension and adapted to contain the motor shaft, and lugs formed on said casing and designed to be removably attached to the rearwardly projecting arms at their converging ends.

3. A device of the character specified, embodying therein a frame comprising a pair of forwardly projecting converging arms and a pair of rearwardly projecting converging arms, a socket carried by and connecting said forwardly projecting arms at their converging ends, a casing adapted to contain the differential gear, said casing having rear lugs adapted to be secured to the rearwardly converging arms and a forward elongated extension projecting through said socket, a tube having one end supported in said extension and its opposite end provided with a substantially spherical enlargement, and means for supporting said spherical enlargement.

4. A device of the character specified, embodying therein a frame comprising a pair of forwardly projecting converging arms and a pair of rearwardly projecting converging arms, oppositely disposed tubes extending substantially at right angles to the plane of said arms and adapted to contain the driving shaft, a socket carried by and connecting said forwardly projecting arms at their converging ends, a casing for containing the differential gear supported within said arms, said casing having an elongated extension projecting through said socket, lugs carried by said casing and adapted to be removably secured to said rearwardly projecting arms at their converging ends, a tube to contain the motor shaft, said tube having one end supported in said elongated extension and its opposite end formed as a substantially spherical enlargement, and means for removably holding said enlarged end of the tube suspended.

In testimony whereof I have affixed my signature in presence of two witnesses.

JULES CAILLET.

Witnesses:
Louis Moses,
H. C. Coxe.